(12) United States Patent
Matsushita et al.

(10) Patent No.: US 7,367,724 B2
(45) Date of Patent: May 6, 2008

(54) IMAGING DEVICE, METHOD OF PRODUCTION OF SAME, AND HOLDING MECHANISM OF SAME

(75) Inventors: Naohisa Matsushita, Kawasaki (JP); Susumu Iida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 198 days.

(21) Appl. No.: 10/992,732

(22) Filed: Nov. 22, 2004

(65) Prior Publication Data
US 2005/0117048 A1  Jun. 2, 2005

(30) Foreign Application Priority Data
Dec. 2, 2003  (JP)  ............... 2003-403527

(51) Int. Cl.
*G03B 17/02* (2006.01)
*H04N 5/225* (2006.01)
*G02B 7/02* (2006.01)

(52) U.S. Cl. ............... 396/529; 396/533; 348/340; 359/829

(58) Field of Classification Search ............... 396/529, 396/533; 359/829; 348/335, 373, 374, 340
See application file for complete search history.

(56) References Cited

U.S. PATENT DOCUMENTS 5,074,682 A * 12/1991 Uno et al. ............... 385/93

| | | |
|---|---|---|
| 6,560,047 B2 | 5/2003 | Choi et al. |
| 2003/0043478 A1 | 3/2003 | Choi et al. |
| 2005/0036778 A1* | 2/2005 | DeMonte ............... 396/89 |
| 2006/0164539 A1* | 7/2006 | Van Arendonk et al. .... 348/340 |

FOREIGN PATENT DOCUMENTS

| | | |
|---|---|---|
| CN | 1402036 A | 3/2003 |
| JP | 60-136687 | 7/1985 |
| JP | 61-154784 A | 7/1986 |
| JP | 05-181043 | 7/1993 |
| JP | 2000-218383 | 8/2000 |

OTHER PUBLICATIONS

Office Action dated Jan. 6, 2006, issued in corresponding Chinese application No. 200410088994.3.
Chinese Office Action, issued in corresponding Chinese patent application No. 200410088994.3, date unknown.

* cited by examiner

*Primary Examiner*—W. B. Perkey
*Assistant Examiner*—Rishi S. Suthar
(74) *Attorney, Agent, or Firm*—Westerman, Hattori, Daniels & Adrian, LLP.

(57) ABSTRACT

An imaging device including a base on which an imaging element is provided, a cylindrically shaped plastic lens member holding a condensing lens at the inside, and a plastic barrel member in which the lens member can move in the axial direction and provided above the imaging element, wherein the barrel member and the lens member are affixed by laser welding, a method of production of the same, and an imaging device holding mechanism used for that production.

4 Claims, 10 Drawing Sheets

IMAGING DEVICE, METHOD OF PRODUCTION OF SAME, AND HOLDING MECHANISM OF SAME

BACKGROUND OF THE INVENTION

1. Field of the Invention

The present invention relates to an imaging device comprised of a base on which an imaging element is provided, a cylindrically shaped plastic lens member holding a condensing lens at the inside, and a plastic barrel member in which the lens member can move in the axial direction and provided on the imaging element, a method of production of the same, and an imaging device holding mechanism used for that production.

2. Description of the Related Art

With digital equipment being made more sophisticated in function and smaller in size, utilization of image recording functions has been increasing. Along with this, small sized camera components, that is, imaging devices, are increasingly being built into that equipment.

As such an imaging device, there is for example one of the configuration shown in FIGS. 9A and 9B. FIG. 9A is a perspective view, while FIG. 9B is a disassembled perspective view. In FIGS. 9A and 9B, a base 1 is provided with a cylindrical plastic barrel member 3. Inside the barrel member 3 and on the base 1 are provided a CCD, C-MOS sensor, or other imaging device 7. The inner circumference of the barrel member 3 is formed with a female thread 9.

The barrel member 3 is provided inside it with a plastic lens member 11. The lens member 11 is provided inside it with a condensing lens (not shown) for condensing light from a subject onto the imaging device 7. Further, the lens member 11 is formed at its bottom outer circumference with a male thread 13 able to engage with the female thread 9 of the barrel member 3.

To assemble an imaging device of such a configuration, first, the lens member 11 is inserted inside the barrel member 3, then the lens member 11 is turned to make the lens member 11 move in the axial direction of the barrel member 3 for focusing. After focusing, an adhesive is used to bond the barrel member 3 and the lens member 11 to thereby fix the condensing lens in place.

Further, when focusing by a lens other than the lens member 11, the following method has also been proposed. For example, unlike FIGS. 9A and 9B, a metal barrel member 3 with no female thread and a metal lens member 11 with no male thread 13 are used, the lens member 11 is inserted inside the barrel member 3, and the lens member 11 and barrel member 3 are affixed by calking (for example, see FIG. 10 and FIG. 11 of Japanese Unexamined Patent Publication (Kokai) No. 5-181043).

With the method of affixing the lens member 11 and the barrel member 3 by an adhesive, there are the following problems:

(1) The adhesive is coated after the focusing work. The device then has to be allowed to stand in a high temperature environment or an ultraviolet environment for tens of minutes to several hours or so of time for complete curing. Shrinkage of the adhesive results in deviation in the relative positions between the lens member 11 and the barrel member 3, so the focus ends up becoming off.

(2) The release of the residual stress remaining in the lens member 11 or the barrel member 3 from the time of forming the member (annealing effect) results in deformation of the entire member and distortion in the image.

(3) When the image obtained is poor, the lens member 11 is detached once from the barrel member 3, the focusing is performed again, then the members are bonded as a repair method. With this method, after detaching the lens member 11 from the barrel member 3 (hereinafter referred to as "reworking"), sometimes the adhesive, a material different from the base materials, remains at the surface of the lens member 11 or barrel member 3 resulting in poor bonding at the time of rebonding.

Next, with the method of affixing the lens member 11 and the barrel member 3 by calking, there are the following problems:

(1) A large force acts on the lens at the time of calking, so the lens deforms or is damaged.
(2) A separate lens is required for focusing, so the cost becomes higher.

SUMMARY OF THE INVENTION

A first object of the present invention is to provide an imaging device giving a good image, a method of production of that imaging device, and a holding mechanism of that imaging device.

A second object of the present invention is to provide an imaging device able to be produced in a short time, a method of production of that imaging device, and a holding mechanism of that imaging device.

A third object of the present invention is to provide an imaging device able to be reliably assembled even with reworking, a method of production of that imaging device, and a holding mechanism of that imaging device.

According to a first aspect of the present invention, there is provided an imaging device comprising a base on which an imaging element is provided, a cylindrically shaped plastic lens member holding a condensing lens at the inside, and a plastic barrel member in which the lens member can move in the axial direction and provided above the imaging element, wherein the barrel member and the lens member are affixed by laser welding.

According to a second aspect of the present invention, there is provided a method of production of an imaging device comprised of a base on which an imaging element is provided, a cylindrically shaped plastic lens member holding a condensing lens at the inside, and a plastic barrel member in which the lens member can move in the axial direction and provided on the imaging element, comprising the steps of moving the lens member in the axial direction of the barrel member for focusing; and welding the barrel member and the lens member using a laser at one point after focusing.

According to a third aspect of the invention, the method of production of an imaging device further comprises, at the time of the step of welding the barrel member and the lens member using a laser, stopping firing of the laser according to the temperature of the part hit by the laser.

According to a fourth aspect of the invention, there is provided an imaging device holding member used when producing an imaging device comprising a base on which an imaging element is provided, a cylindrically shaped plastic lens member holding a condensing lens at the inside, and a plastic barrel member in which the lens member can move in the axial direction and provided above the imaging element, the barrel member and the lens member welded together using a laser, comprising a first clamp and a second clamp abutting against the circumference of the barrel member and gripping the barrel member, the clamp at the laser welded location side among the first clamp and second clamp having a heat conductivity better than the other clamp and being in facial contact with the circumference of the barrel member.

According to the above aspects of the invention, since the barrel member and the lens member are affixed by laser welding, it is possible to make use of the high peak power characteristic of a laser beam and join the members with little deformation of the area around the part hit by the laser, there is little deformation of the lens member 61 and the barrel member 53, and a distortion-free, good image can be obtained.

Further, since a laser is used for welding, assembly is possible in a short time. Further, at the time of reworking, since a single point is welded, the reworked member can be easily detached. Also, since there is no interposition of a material different from the base material at the welded part at the time of reworking, reliable assembly is possible.

According to the method of production of an imaging device according to the present invention, since the lens member is moved in the axial direction of the barrel member for focusing, then the barrel member and the lens member are welded at one point by laser, a stable image can always be obtained.

According to the method of production of an imaging device according to the present invention, since the laser stops being fired according to the temperature of the part hit by the laser at the time of the step of welding the barrel member and the lens member using a laser, the plastic lens member and barrel member can be prevented from being carbonized or otherwise changed in material.

According to the imaging device holding mechanism of the present invention, since the first clamp and the second clamp are comprised of a first clamp and a second clamp welded together using a laser, abutting against the circumference of the barrel member, and gripping the barrel member and since the clamp at the laser welded location side among the first clamp and second clamp comes in facial contact with the circumference of the barrel member, the heat generated by the welding is conducted quickly to the clamp at the laser welded location side, so deformation of the barrel member and lens member due to over welding can be prevented and a good image can be obtained.

BRIEF DESCRIPTION OF THE DRAWINGS

These and other objects and features of the present invention will become clearer from the following description of the preferred embodiments given with reference to the attached drawings, wherein:

FIGS. 1A and 1B are views of an imaging device according to an embodiment of the present invention, wherein FIG. 1A is a perspective view and FIG. 1B is a disassembled perspective view.

DESCRIPTION OF THE PREFERRED EMBODIMENTS

A preferred embodiment of the present invention will be described in detail below while referring to the attached figures.

(Imaging Device)

Figure 1A:
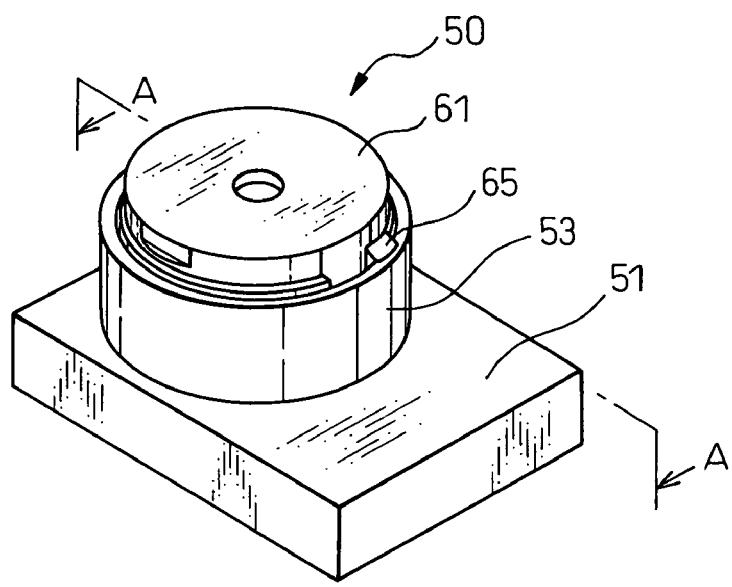
Figure 1B:
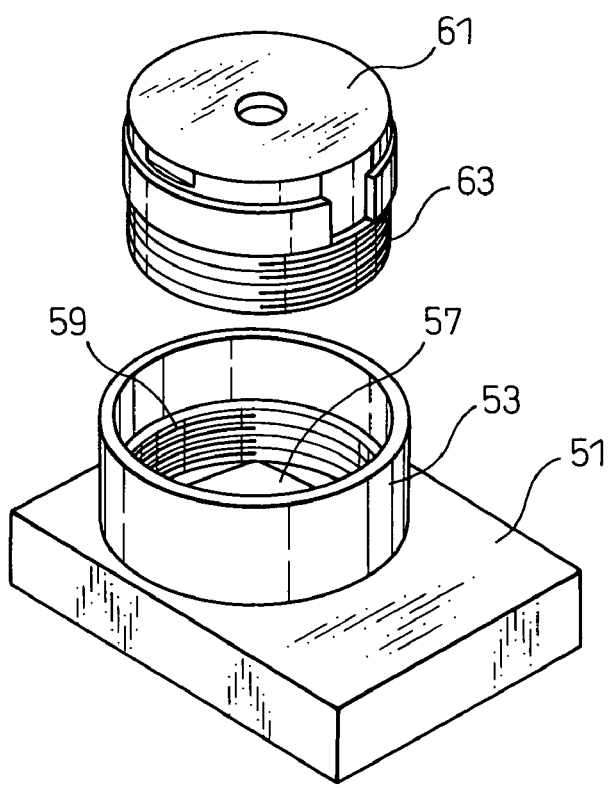
Figure 2:
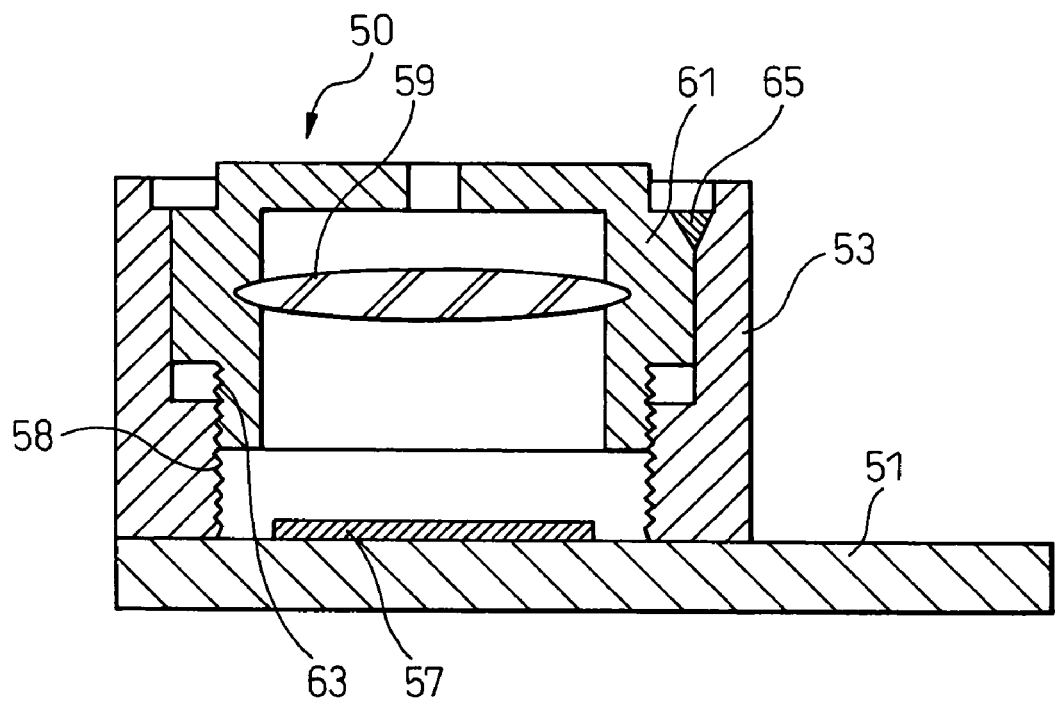
FIG. 2 is a sectional view of the configuration along the line A-A of FIG. 1A.

First, the imaging device 50 of this embodiment will be explained. FIGS. 1A and 1B are views of an imaging device of the present embodiment, wherein FIG. 1A is a perspective view and FIG. 1B is a disassembled perspective view, and FIG. 2 is sectional view of the configuration along the line A-A of FIG. 1A.

In these figures, a base 51 is provided with a cylindrical plastic barrel member 53. Inside the barrel member 53 and on the base 51 are provided a CCD, C-MOS sensor, or other imaging device 57. The inner circumference of the barrel member 53 is formed with a female thread 58.

The barrel member 53 is provided inside it with a plastic lens member 61. The lens member 61 is provided inside it with a condensing lens 59 for condensing light from a subject onto the imaging device 57. Further, the lens member 61 is formed at its bottom outer circumference with a male thread 63 able to engage with the female thread 58 of the barrel member 53.

In the imaging device 50 of this configuration, first, the lens member 61 is inserted inside the barrel member 53 and the lens member 61 is turned to make the lens member 61 move in the axial direction of the barrel member 53 for focusing.

The barrel member 53 and the lens member 61 are affixed by laser welding. At the boundary between the barrel member 53 and the lens member 61, a weld 65 is formed at a single point by the laser.

(Production System)

Figure 3:
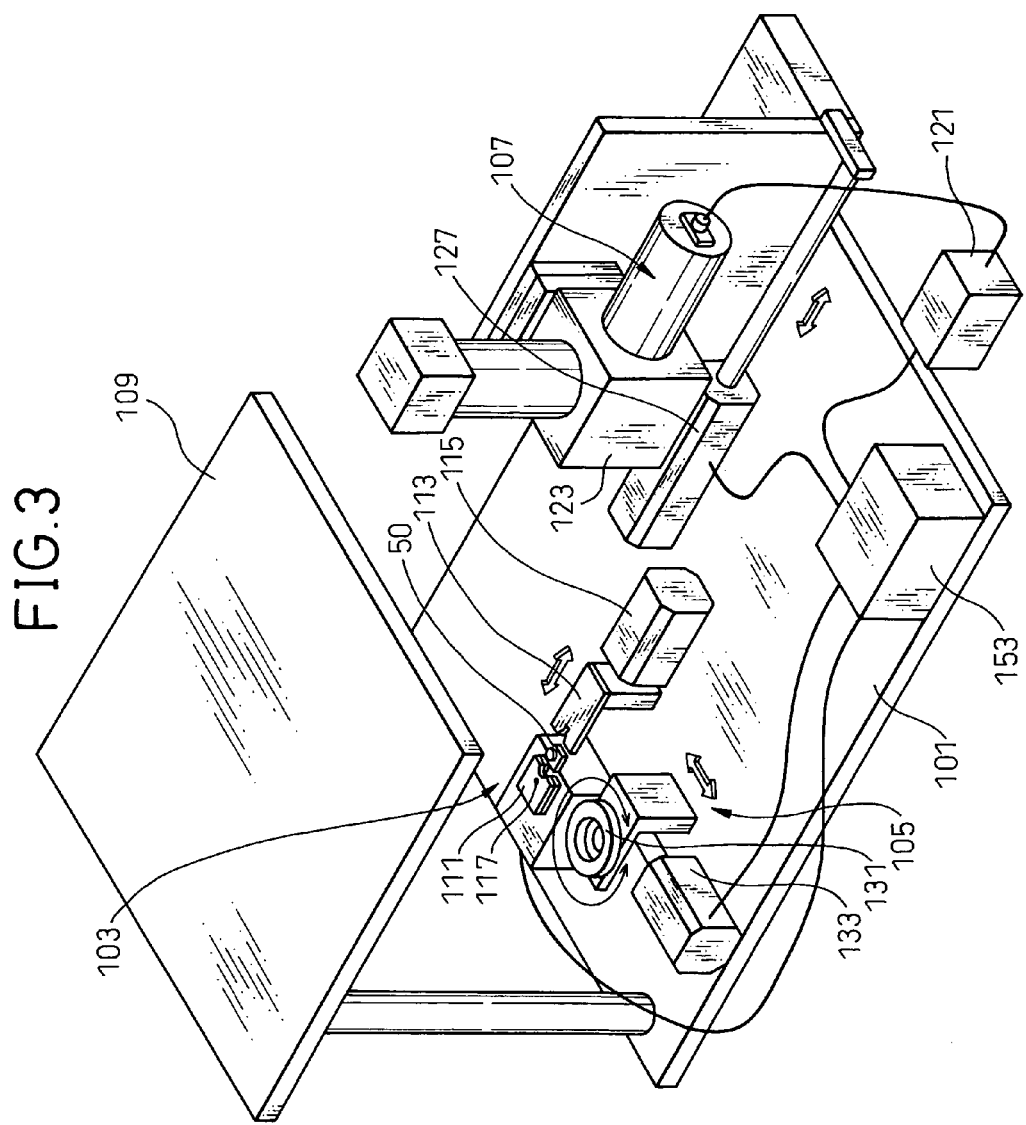
FIG. 3 is a view of the overall configuration of a production system.
Figure 4:
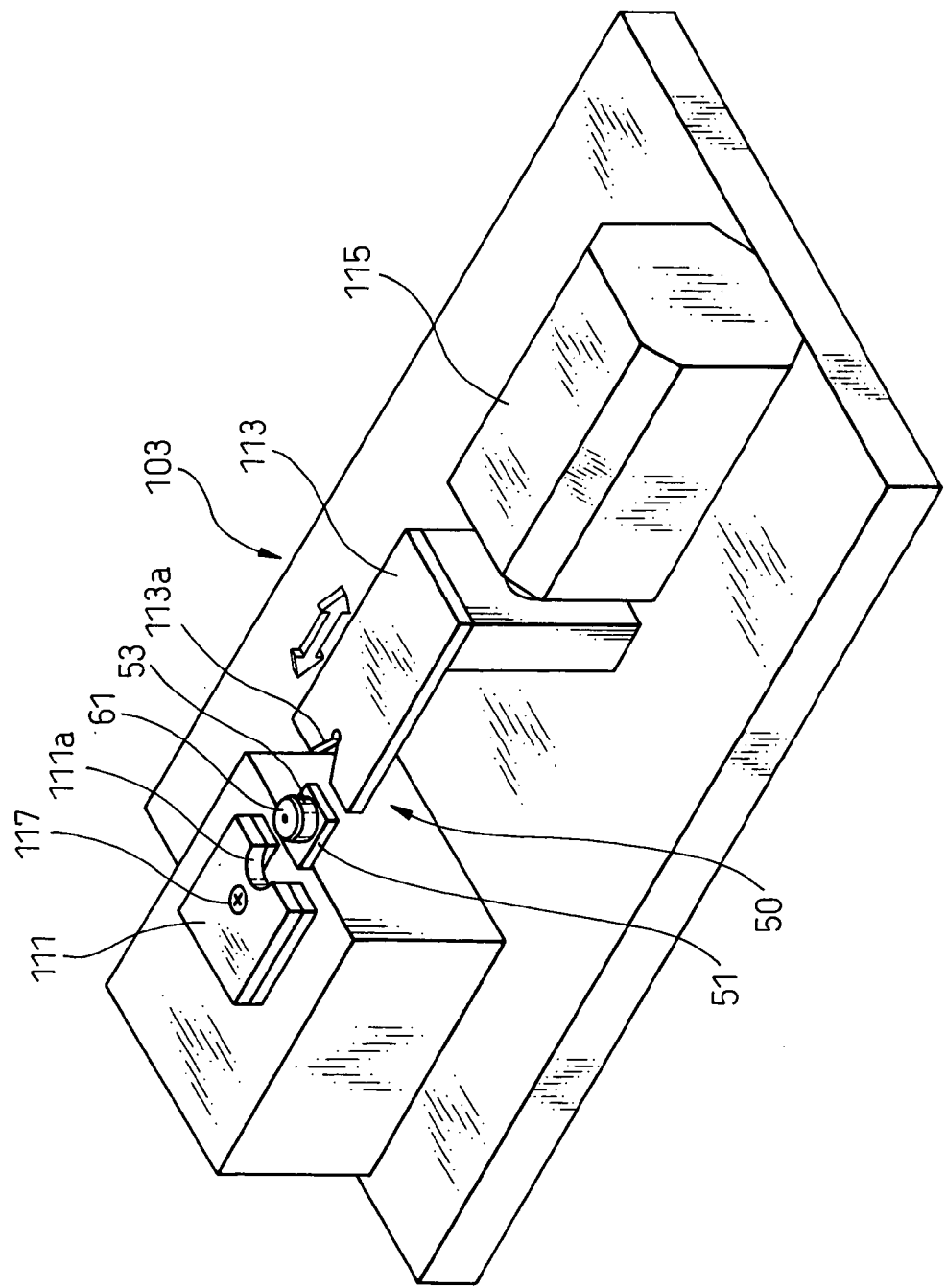
FIG. 4 is an enlarged view of an imaging device holding mechanism of FIG. 3.
Figure 5:
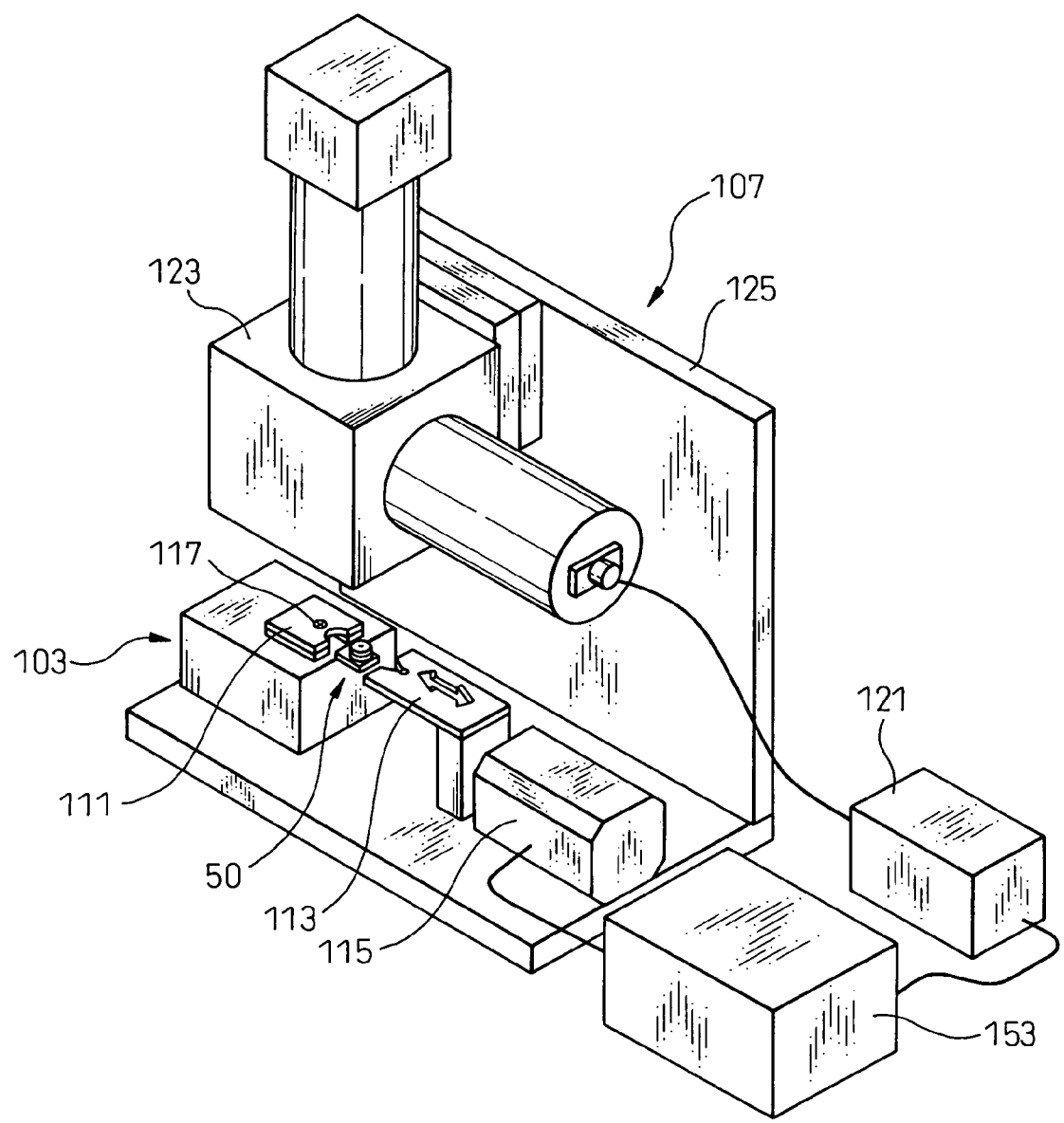
FIG. 5 is an enlarged view of a laser firing mechanism of FIG. 3.

Next, a method of production of an imaging device of the configuration shown in FIGS. 1A and 1B and FIG. 2 will be explained. First, FIG. 3 to FIG. 5 will be used to explain the system used at the time of production. FIG. 3 is a view of the overall configuration of a production system; FIG. 4 is an enlarged view of an imaging device holding mechanism of FIG. 3; and FIG. 5 is an enlarged view of a laser firing mechanism of FIG. 3.

In FIG. 3, a common base 101 is provided with an imaging device holding mechanism 103, a focusing mechanism 105, and a laser firing mechanism 107. Further, above the imaging device holding mechanism 103 is provided a board 109 with a test pattern on its bottom surface used for focusing.

Next, using FIG. 4, the imaging device holding mechanism 103 will be explained. The imaging device holding mechanism 103 has a first clamp 111 and a second clamp 113 for abutting against the circumference of the barrel member 53 of the imaging device 50 and gripping the barrel member 53. In this embodiment, the first clamp 111 is fixed in place, while the second clamp 113 can be made to approach or move away from the first clamp 111 by an air cylinder 115. The first clamp 111 is formed with an arc-shaped groove 111a enabling facial contact with the circumference of the barrel member 53 of the imaging device 50, while the second clamp 113 is formed with a substantially V-shaped groove 113*a* enabling two-point contact with the circumference of the barrel member 53 of the imaging device 50. Further, in this embodiment, the first clamp 111 and the second clamp 113 are made of the good heat conductivity aluminum. Further, the first clamp 111 is provided with a temperature sensor 117 for measuring the temperature (temperature of circumference of barrel member 53) near the part hit by the laser at the time of welding.

Next, using FIG. 5, the laser firing mechanism 107 will be explained. The laser beam generated by a laser oscillator 121 is fired from a firing unit 123. The firing unit 123 is provided so as to be able to move on a sub base 125 provided in a vertical direction. Further, the sub base 125 is designed to be able to approach or move away from the imaging device holding mechanism 103 by the air cylinder 127 shown in FIG. 3.

Next, returning to FIG. 3, the focusing mechanism 105 will be explained. The focusing mechanism 105 has a clamp 131 able to enable with the lens member 61 of the imaging device 50 and turning the lens member 61 at the time of engagement. This clamp 131 is designed to be able to approach or move away from the imaging device 50 held by the imaging device holding mechanism 103 by an air cylinder 133.

Figure 6:
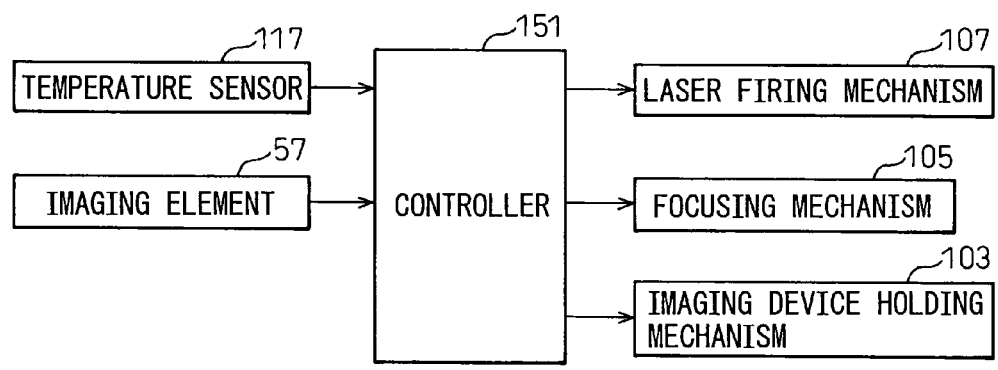
FIG. 6 is a block diagram for explaining the electrical configuration of the production system of FIG. 3.

Next, using FIG. 6, the electrical configuration of the production system will be explained. In the figure, reference numeral 151 is a controller for acquiring temperature information of the temperature sensor 117 and image data from the imaging element 57 of the imaging device 50 and controlling the operation of the laser firing mechanism 107, the focusing mechanism 105, and the imaging device holding mechanism 103. The controller 151 is provided inside a control unit 153 shown in FIG. 3 and FIG. 5.

Figure 7:
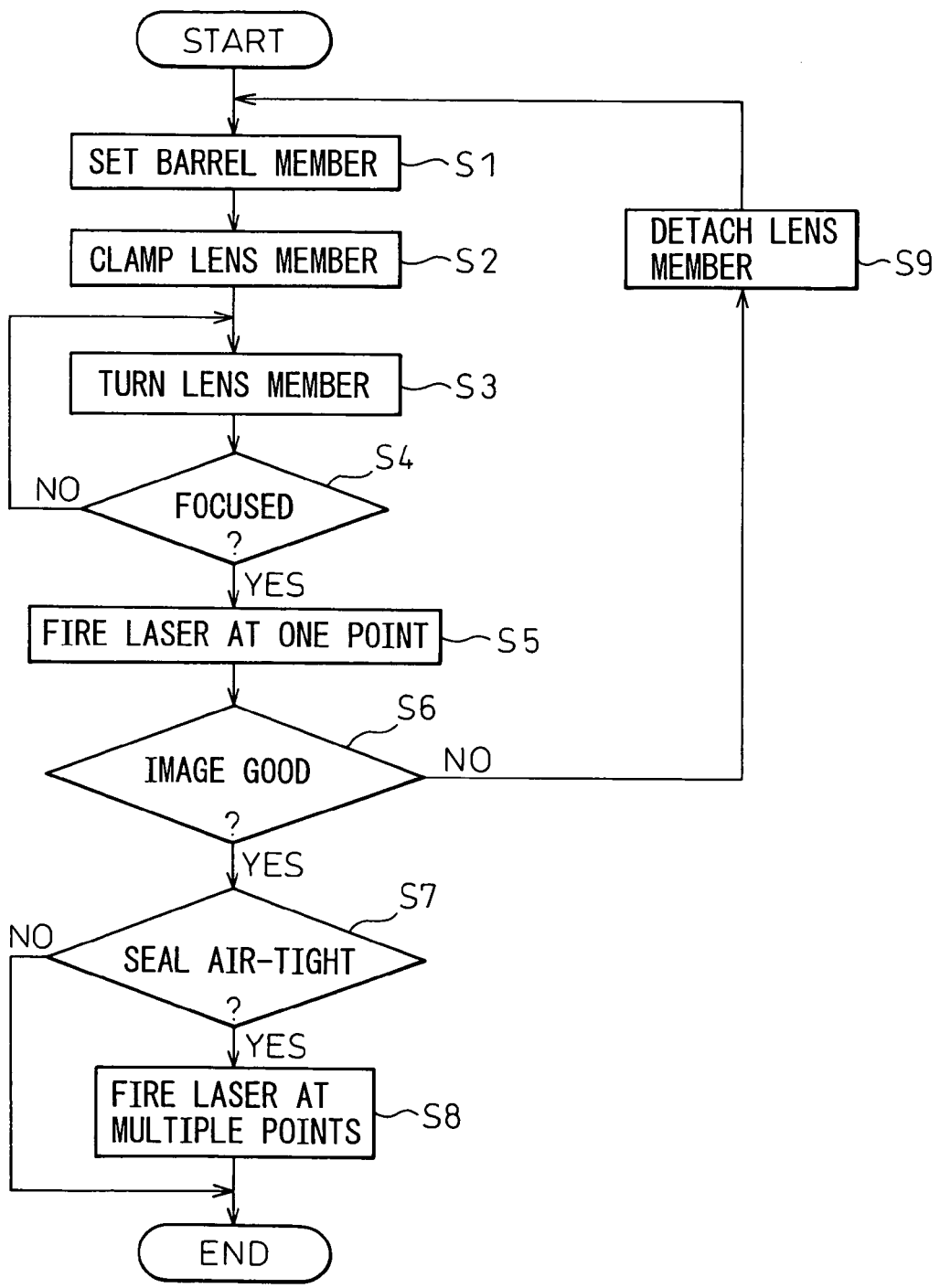
FIG. 7 is a view of the flow of production.

Next, using FIG. 7 showing a flow of production, the assembly process will be explained. First, an assembly comprised of the base 51, imaging element 57, and barrel member 53 are gripped and set by the first clamp 111 and the second clamp 113 of the imaging device holding mechanism 103 (step S1). At this time, the controller 151 can acquire image data of the test pattern on the board 109 from the electrodes of the imaging element 57.

Next, the lens member 61 with which the condensing lens 59 is assembled is set in the clamp 131 of the focusing mechanism 105. When the lens member 61 is set, the controller 151 drives the air cylinder 133 of the focusing mechanism 105 to move the clamp 131 above the assembly of the base 51, imaging element 57, and barrel member 53 set at the imaging device holding mechanism 103 (FIG. 2) (step S2).

Next, the controller 151 makes the clamp 131 of the focusing mechanism 105 turn to screw the lens member 161 into the barrel member 53 and move the lens member 61 in the axial direction of the barrel member 43 (step S3). The controller 151 performs the focusing while viewing the image data of the test pattern from the imaging element 57 (step S4). The controller 151 drives the air cylinder 127 of the laser firing mechanism 107 to move the firing unit 123 of the laser firing mechanism 107 above the imaging device 50 held by the imaging device holding mechanism 103 and fires the laser at one point at the boundary between the barrel member 53 and lens member 61 to affix the two (53, 61) (step S5). Further, at step S5, the controller monitors the temperature near the part hit by the laser at the time of welding by the temperature sensor 117 and stops firing the laser when the temperature reaches a set temperature or more. Further, in this embodiment, the laser is fired at the first clamp 111 side.

Next, the controller 151 sees if the focus is off or not from the image data of the test pattern from the imaging element 57 (step S6). When the focus is off, the device is defective, so the barrel member 53 is detached from the lens member 61 (step S9) and the routine returns to step S1.

When the device is found not to be defective at step S6, if the imaging device 50 to be produced is not one of a specification requiring an air-tight seal or a specification requiring a strong bond strength (step S7), the assembly is completed. If the imaging device 50 to be produced is one of a specification requiring an air-tight seal or a specification requiring a strong bond strength, the controller 151 drives the laser firing mechanism 107 to weld the boundary between the barrel member 53 and the lens member 61 by laser at multiple points (step S8) to complete the assembly. At step S8 as well, the controller 151 monitors the temperature near the part hit by the laser at the time of welding by the temperature sensor 117 and stops firing the laser when the temperature reaches a set temperature or more.

According to this embodiment, the following effects can be obtained:

(1) Since the barrel member 53 and the lens member 61 are affixed by laser welding, it is possible to make use of the high peak power characteristic of a laser beam and join the members with little deformation of the area around the part hit by the laser, there is little deformation of the lens member 61 and the barrel member 53, and a distortion-free, good image can be obtained.

(2) Since a laser is used for welding, assembly is possible in a short time.

(3) Since a laser is used for welding, there is no interposition of a material different from the base material at the welded part at the time of reworking, so reliable assembly is possible.

(4) Since the laser stops being fired according to the temperature of the part hit by the laser at the time of the step of welding using the laser, the barrel member 53 and lens member 61 can be prevented from being carbonized or otherwise changed in material.

(5) Since the first clamp 111 and the second clamp 113 are made from aluminum with a good heat conductivity, the heat generated by the welding is conducted quickly to the clamps, so deformation of the barrel member 53 and lens member 61 due to over welding can be prevented and a good image can be obtained.

(6) Since the first clamp 111 comes into facial contact with the circumference of the barrel member 53, the heat generated by the welding is conducted to the clamp at the laser welded location side, so deformation of the barrel member 53 and lens member 61 due to over welding can be prevented and a good image can be obtained.

(7) Since the temperature sensor 117 monitors the temperature near the part hit by the laser at the time of welding and, when the temperature reaches a set temperature or more, the laser stops being fired, the barrel member 53 and lens member 61 can be prevented from being carbonized or otherwise changed in material.

Figure 8:
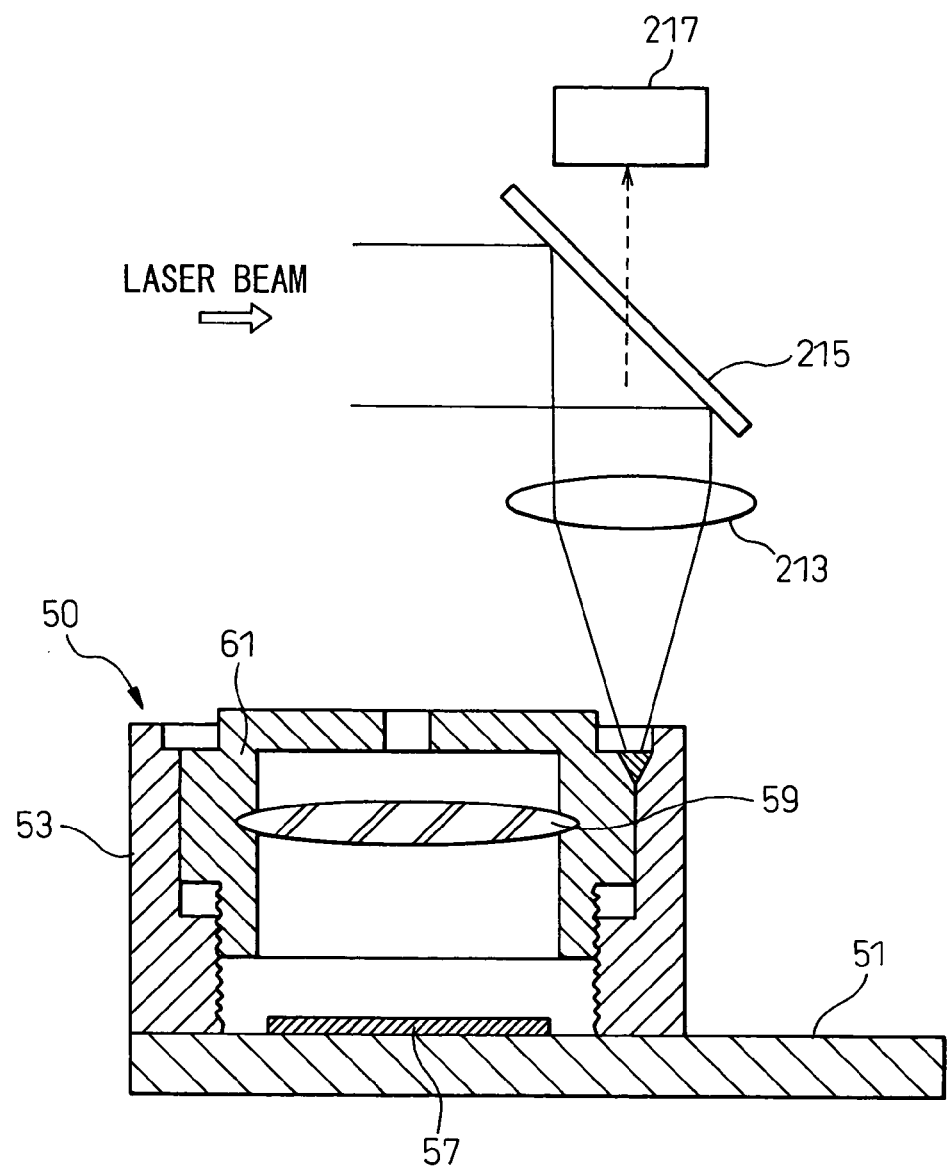
FIG. 8 is a view for explaining another embodiment.
Figure 9A:
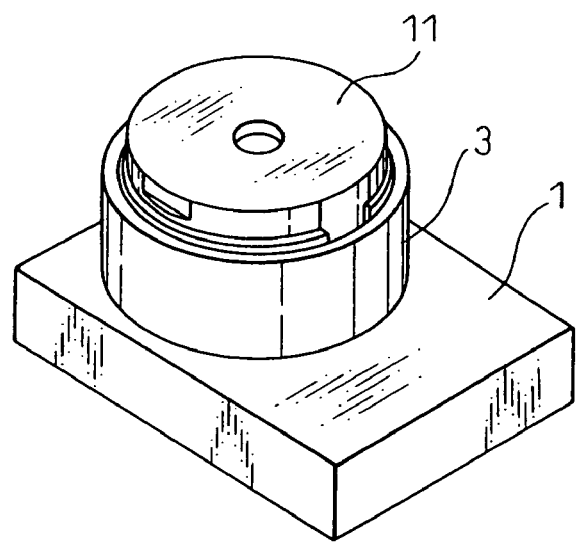
FIGS. 9A and 9B are views for explaining an imaging device of the related art.
Figure 9B:
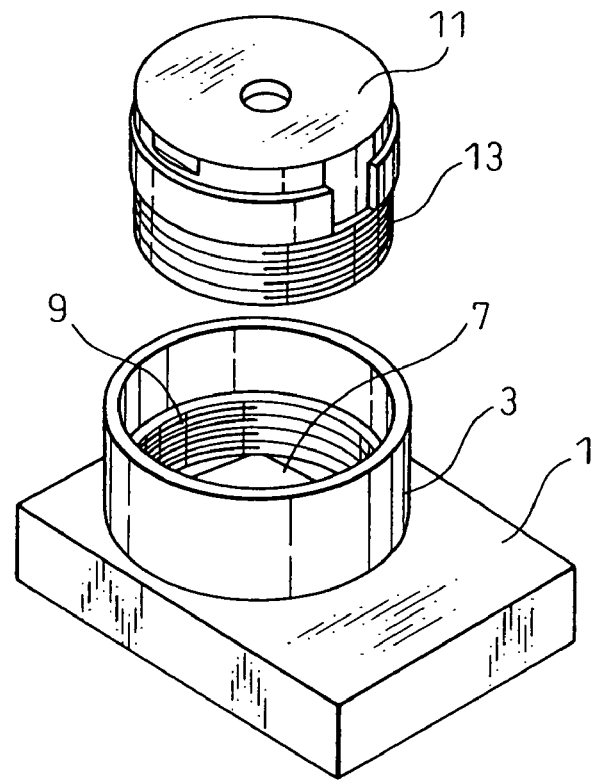
Figure 10:
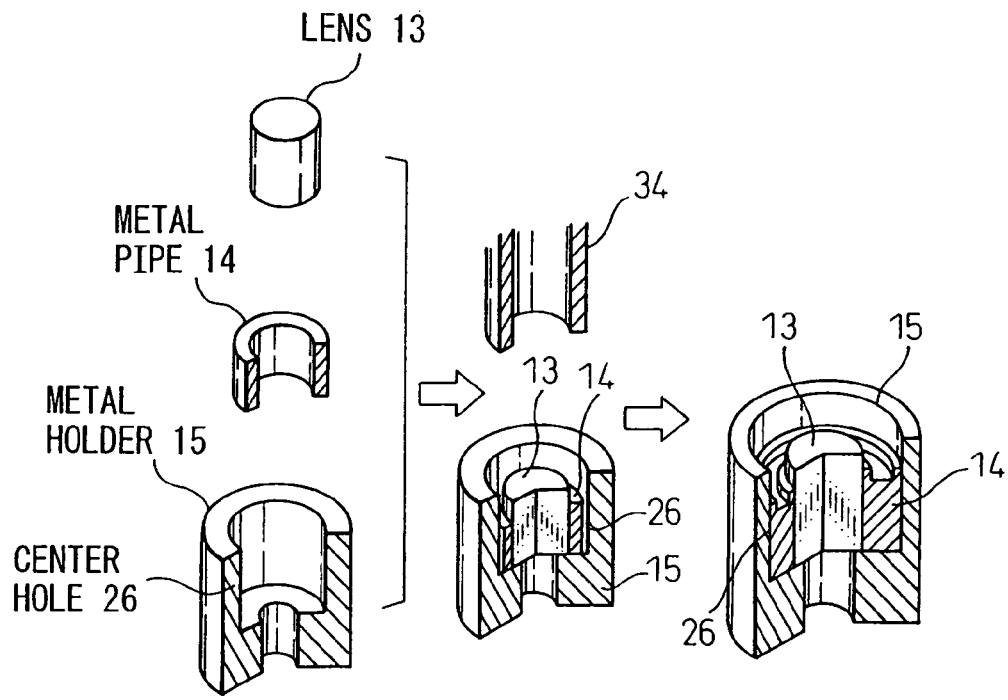
FIG. 10 is shown using FIG. 2 of Japanese Unexamined Patent Publication (Kokai) No. 5-181043.
Figure 11:
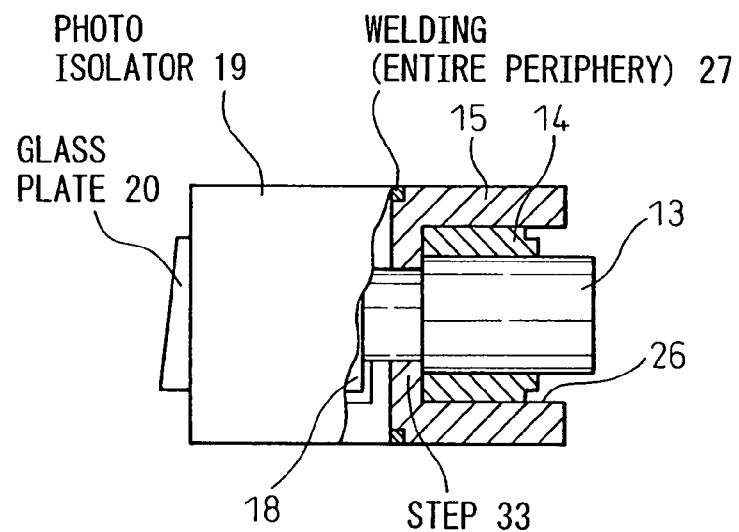
FIG. 11 is shown using FIG. 3 of Japanese Unexamined Patent Publication (Kokai) No. 5-181043.

Further, the present invention is not limited to the above embodiment. In the above embodiment, the temperature sensor 117 provided at the first clamp 111 was designed to detect the temperature near the part hit by the laser (temperature of circumference of barrel member 53), but as shown in FIG. 8, if using a dichroic mirror 215 reflecting only light of a specific wavelength region and passing light of the remaining wavelength region, the temperature sensor 217 may also measure the temperature of the welded part. Reference numeral 213 is a lens for condensing the laser beam.

While the invention has been described with reference to specific embodiments chosen for purpose of illustration, it should be apparent that numerous modifications could be made thereto by those skilled in the art without departing from the basic concept and scope of the invention.

What is claimed is:

1. An imaging device comprising:
  a base on which an imaging element is provided,
  a cap shaped plastic lens member holding a condensing lens at the inside, and
  a plastic barrel member in which the lens member can move in an axial direction and provided above the imaging element,
  wherein the cap shaped plastic lens member is formed at its bottom outer circumference with a male thread able to engage with a female thread formed at a bottom inner circumference of the plastic barrel member, and a facing point between an outer periphery of a ceiling portion of said cap shaped plastic lens member having a lens hole at its center and an upper inside circumference of said plastic barrel member are affixed by a laser weld,
  wherein the laser weld is formed at a boundary between the outer circumference of the cap shaped plastic lens member and the inner circumference of the plastic barrel member where neither of the members are threaded.

2. An imaging device as set forth in claim 1, wherein said barrel member and said lens member are welded at multiple points.

3. A method of production of an imaging device comprised of a base on which an imaging element is provided, a cap shaped plastic lens member holding a condensing lens at the inside, and a plastic barrel member in which the lens member can move in an axial direction and provided above the imaging element, comprising the steps of:
  moving said lens member in the axial direction of said barrel member for focusing;
  welding said barrel member and said lens member using a laser at one point after said focusing;
  inspecting if the focus is off or not after finishing the one point laser welding;
  achieving multiple point welding in addition to the one point welding if the focus is not defective and also if the imaging device to be produced is one of a specification requiring an air-tight seal or a specification requiring a strong bond strength; and
  stopping firing of the laser according to a temperature of a part hit by said laser at a time of said step of welding said barrel member and said lens member using a laser.

4. An imaging device as set forth in claim 1, wherein said barrel member and said lens member are affixed by laser welding at a single point.

* * * * *